(12) United States Patent
Wiedenhoefer et al.

(10) Patent No.: US 12,435,928 B2
(45) Date of Patent: Oct. 7, 2025

(54) AIRCRAFT HEAT EXCHANGER

(71) Applicant: Raytheon Technologies Corporation, Farmington, CT (US)

(72) Inventors: James F. Wiedenhoefer, Windsor, CT (US); Russell J. Bergman, South Windsor, CT (US); Patrick M. Hart, Enfield, CT (US)

(73) Assignee: RTX Corporation, Farmington, CT (US)

( * ) Notice: Subject to any disclaimer, the term of this patent is extended or adjusted under 35 U.S.C. 154(b) by 326 days.

(21) Appl. No.: 17/767,203

(22) PCT Filed: Jan. 18, 2021

(86) PCT No.: PCT/US2021/013804
§ 371 (c)(1),
(2) Date: Apr. 7, 2022

(87) PCT Pub. No.: WO2021/146674
PCT Pub. Date: Jul. 22, 2021

(65) Prior Publication Data
US 2022/0373263 A1    Nov. 24, 2022

Related U.S. Application Data

(60) Provisional application No. 62/963,072, filed on Jan. 19, 2020.

(51) Int. Cl.
*F28D 1/02*        (2006.01)
*B64D 33/08*       (2006.01)
(Continued)

(52) U.S. Cl.
CPC ........... *F28D 1/0246* (2013.01); *B64D 33/08* (2013.01); *F28D 1/0478* (2013.01);
(Continued)

(58) Field of Classification Search
CPC .... F28D 1/0471; F28D 1/0475; F28D 1/0476; F28D 1/035; F28D 1/022; F28D 1/025;
(Continued)

(56) References Cited

U.S. PATENT DOCUMENTS

| | | |
|---|---|---|
| 4,137,705 A | 2/1979 | Anderson et al. |
| 4,438,809 A | 3/1984 | Papis |

(Continued)

FOREIGN PATENT DOCUMENTS

| | | |
|---|---|---|
| CN | 108869044 A | 11/2018 |
| CN | 110553533 A | 12/2019 |

(Continued)

OTHER PUBLICATIONS

US Office Action dated Jul. 6, 2023 for U.S. Appl. No. 17/125,214 (published as 2021/0207535A1).

(Continued)

*Primary Examiner* — Jianying C Atkisson
*Assistant Examiner* — For K Ling
(74) *Attorney, Agent, or Firm* — Bachman & LaPointe, P.C.

(57) ABSTRACT

A heat exchanger plate provides heat transfer between a first flow along a first flowpath and a second flow along a second flowpath. The heat exchanger plate has a substrate having: a first face and a second face opposite the first face; a leading edge along the second flowpath and a trailing edge along the second flowpath; a proximal portion having a plurality of inlet ports along the first flowpath and a plurality of outlet ports along the first flowpath; and a plurality of passageways along the first flowpath. Each passageway extends between a respective associated said inlet port of the plate and a respective associated said outlet port of the plate.

22 Claims, 12 Drawing Sheets

(51) Int. Cl.
*F28D 1/047* (2006.01)
*F28D 21/00* (2006.01)

(52) U.S. Cl.
CPC ............... *F28D 2001/0273* (2013.01); *F28D 2021/0021* (2013.01); *F28D 2021/0026* (2013.01)

(58) Field of Classification Search
CPC ........ F28D 1/0383; F28D 1/0341; F28D 7/06; F28D 2021/0026; F28D 1/0246; F28F 9/0204; B21D 53/02; B21D 53/06; B21D 53/08
See application file for complete search history.

(56) References Cited

U.S. PATENT DOCUMENTS

| | | | |
|---|---|---|---|
| 4,520,867 A * | 6/1985 | Sacca | F28D 1/0475 165/150 |
| 4,520,868 A | 6/1985 | Grawey | |
| 4,798,242 A * | 1/1989 | Kito | F28F 27/02 165/103 |
| 4,813,112 A | 3/1989 | Pilliez | |
| 5,318,114 A | 6/1994 | Sasaki | |
| 5,417,280 A | 5/1995 | Hayashi et al. | |
| 5,443,116 A | 8/1995 | Hayashi et al. | |
| 5,517,757 A | 5/1996 | Hayashi et al. | |
| 5,531,268 A | 7/1996 | Hoshino et al. | |
| 6,134,880 A | 10/2000 | Yoshinaka | |
| 6,328,100 B1 | 12/2001 | Haussmann | |
| 6,357,113 B1 | 3/2002 | Williams | |
| 6,422,307 B1 | 7/2002 | Bhatti et al. | |
| 6,430,931 B1 | 8/2002 | Horner | |
| 6,564,863 B1 | 5/2003 | Martins | |
| 6,607,026 B1 | 8/2003 | Naji et al. | |
| 6,752,203 B2 * | 6/2004 | Kurita | F24D 5/10 165/56 |
| 6,896,043 B2 * | 5/2005 | Dunn | F28D 9/0062 165/165 |
| 6,945,320 B2 | 9/2005 | Harvard, Jr. et al. | |
| 6,966,173 B2 | 11/2005 | Dewis | |
| 7,334,411 B2 | 2/2008 | Vandermolen | |
| 7,669,645 B2 | 3/2010 | Nakamura | |
| 7,784,528 B2 | 8/2010 | Ottow et al. | |
| 7,861,512 B2 | 1/2011 | Olver et al. | |
| 7,950,149 B2 | 5/2011 | Golecki | |
| 8,181,443 B2 | 5/2012 | Rago | |
| 8,266,888 B2 | 9/2012 | Liu | |
| 8,387,362 B2 | 3/2013 | Storage et al. | |
| 8,438,835 B2 | 5/2013 | Perveiler et al. | |
| 8,573,291 B2 | 11/2013 | Vick | |
| 8,656,988 B1 | 2/2014 | Paul et al. | |
| 8,689,547 B2 | 4/2014 | Burgers et al. | |
| 8,770,269 B2 | 7/2014 | Scott | |
| 8,784,047 B2 | 7/2014 | Elder | |
| 9,200,855 B2 | 12/2015 | Kington et al. | |
| 9,243,563 B2 | 1/2016 | Lo | |
| 9,328,968 B2 | 5/2016 | Vanderwees | |
| 9,377,250 B2 | 6/2016 | Landre | |
| 9,732,702 B2 | 8/2017 | Ueda | |
| 9,766,019 B2 | 9/2017 | Eleftheriou et al. | |
| 9,771,867 B2 | 9/2017 | Karam et al. | |
| 9,816,766 B2 | 11/2017 | Miller et al. | |
| 9,835,043 B2 | 12/2017 | Kantany et al. | |
| 9,851,159 B2 | 12/2017 | Cameron | |
| 9,909,812 B2 | 3/2018 | Peskos et al. | |
| 9,982,630 B2 | 5/2018 | Marini et al. | |
| 10,041,741 B2 | 8/2018 | Turcotte et al. | |
| 10,100,740 B2 | 10/2018 | Thomas | |
| 10,125,684 B2 | 11/2018 | Yu | |
| 10,175,003 B2 | 1/2019 | Sennoun et al. | |
| 10,184,400 B2 | 1/2019 | Cerny et al. | |
| 10,208,621 B2 | 2/2019 | Hoefler et al. | |
| 10,221,768 B2 | 3/2019 | Agg | |
| 10,222,142 B2 | 3/2019 | Alvarez et al. | |
| 10,316,750 B2 | 6/2019 | Loebig et al. | |
| 10,422,585 B2 | 9/2019 | Jensen et al. | |
| 10,480,407 B2 | 11/2019 | Alecu | |
| 10,545,001 B2 * | 1/2020 | Schwalm | F28D 1/0408 |
| 10,830,540 B2 | 11/2020 | Sennoun et al. | |
| 2001/0018024 A1 | 8/2001 | Hyde et al. | |
| 2004/0026072 A1 | 2/2004 | Yi et al. | |
| 2004/0050531 A1 | 3/2004 | Horiuchi et al. | |
| 2004/0111829 A1 | 6/2004 | Bruno et al. | |
| 2006/0067052 A1 * | 3/2006 | Llapitan | F28D 1/05375 257/E23.098 |
| 2009/0169359 A1 | 7/2009 | Murphy et al. | |
| 2010/0084120 A1 | 4/2010 | Yin et al. | |
| 2010/0170262 A1 | 7/2010 | Kaslusky et al. | |
| 2011/0088405 A1 | 4/2011 | Turco | |
| 2011/0146944 A1 | 6/2011 | Hand et al. | |
| 2011/0168366 A1 | 7/2011 | Garret et al. | |
| 2013/0199152 A1 | 8/2013 | Menheere et al. | |
| 2013/0201628 A1 * | 8/2013 | Aoki | F28F 9/262 361/699 |
| 2014/0246179 A1 | 9/2014 | Vallee et al. | |
| 2014/0318751 A1 | 10/2014 | Kinder et al. | |
| 2015/0047818 A1 | 2/2015 | Peskos et al. | |
| 2015/0047820 A1 | 2/2015 | Rhoden | |
| 2015/0200429 A1 * | 7/2015 | Lee | H01M 10/613 429/120 |
| 2016/0069266 A1 | 3/2016 | Murphy et al. | |
| 2016/0123230 A1 | 5/2016 | Thomas | |
| 2016/0177828 A1 | 6/2016 | Snyder et al. | |
| 2016/0230595 A1 | 8/2016 | Wong et al. | |
| 2016/0230669 A1 | 8/2016 | Selstad et al. | |
| 2016/0265850 A1 | 9/2016 | Kupiszewski et al. | |
| 2016/0362999 A1 | 12/2016 | Ho | |
| 2017/0009703 A1 | 1/2017 | Moon et al. | |
| 2017/0184024 A1 | 6/2017 | Sennoun | |
| 2017/0198637 A1 * | 7/2017 | Cerny | F28F 3/14 |
| 2017/0363361 A1 | 12/2017 | Turney | |
| 2018/0051935 A1 | 2/2018 | Roberge | |
| 2018/0058472 A1 | 3/2018 | Tajiri et al. | |
| 2018/0172368 A1 | 6/2018 | Kowalski et al. | |
| 2018/0238238 A1 | 8/2018 | Luschek et al. | |
| 2018/0238630 A1 | 8/2018 | Pollard et al. | |
| 2018/0244127 A1 | 8/2018 | Sennoun et al. | |
| 2018/0245853 A1 | 8/2018 | Sennoun et al. | |
| 2018/0258859 A1 | 9/2018 | Suciu et al. | |
| 2018/0292140 A1 | 10/2018 | Mayo et al. | |
| 2018/0328285 A1 | 11/2018 | Tajiri et al. | |
| 2019/0154345 A1 | 5/2019 | Martinez et al. | |
| 2019/0170445 A1 | 6/2019 | McCaffrey | |
| 2019/0170455 A1 | 6/2019 | McCaffrey | |
| 2019/0204012 A1 | 7/2019 | Army et al. | |
| 2019/0212074 A1 | 7/2019 | Lockwood et al. | |
| 2019/0234690 A1 | 8/2019 | Disori et al. | |
| 2019/0277571 A1 | 9/2019 | Disori et al. | |
| 2019/0277579 A1 | 9/2019 | Disori et al. | |
| 2019/0293365 A1 | 9/2019 | Disori et al. | |
| 2019/0310030 A1 | 10/2019 | Disori et al. | |
| 2019/0339012 A1 | 11/2019 | Disori et al. | |
| 2019/0368819 A1 * | 12/2019 | Gupte | F25B 39/00 |
| 2020/0347737 A1 | 11/2020 | Bordoni | |
| 2021/0207535 A1 | 7/2021 | Bergman et al. | |
| 2021/0222624 A1 | 7/2021 | Wiedenhoefer et al. | |
| 2021/0222962 A1 | 7/2021 | Wiedenhoefer et al. | |
| 2021/0222963 A1 | 7/2021 | Bergman et al. | |
| 2021/0285375 A1 | 9/2021 | Wiedenhoefer et al. | |
| 2021/0318071 A1 | 10/2021 | Hart et al. | |

FOREIGN PATENT DOCUMENTS

| | | |
|---|---|---|
| DE | 9309822 U1 | 11/1994 |
| DE | 19515528 A1 | 10/1996 |
| DE | 102008051422 A1 | 4/2010 |
| EP | 656517 A1 | 11/1994 |
| FR | 2770632 A1 | 5/1999 |
| FR | 3075870 A1 | 6/2019 |
| GB | 574450 A | 1/1946 |
| GB | 840584 A * | 3/1958 ............ B21D 53/02 |

(56) References Cited

FOREIGN PATENT DOCUMENTS

| JP | H0961084 A | 3/1997 |
|---|---|---|
| WO | 2021/138307 A1 | 7/2021 |

OTHER PUBLICATIONS

European Search Report dated Feb. 7, 2022 for European Patent Application No. 21740964.8 (PCT/US2021/013804-WO/2021/146674).

International Search Report and Written Opinion dated Mar. 31, 2021 for PCT/US2021/013804-WO/2021/146674.

Chris Wiegand et al., "F-35 Air Vehicle Technology Overview", Aviation Technology, Integration, and Operations Conference, Jun. 2018, American Institute of Aeronautics and Astronautics, Inc., Reston, Virginia.

Jonathan Lowell, "Keeping Cool over Salt Lake", Aug. 25, 2019, US Air Force, Washington, DC, retrieved from Internet Nov. 9, 2019 https://www.af.mil/News/Commentaries/Display/Article/1941943/keeping-cool-over-salt-lake/.

Sean Robert Nuzum, Thesis: "Aircraft Thermal Management using Liquefied Natural Gas", Apr. 27, 2016, Wright State University, Dayton, Ohio.

European Search Report and Opinion dated Oct. 20, 2021 for European Patent Application No. 20218011.3.

US Office Action dated Nov. 9, 2021 for U.S. Appl. No. 17/139,174.

US Office Action dated Dec. 13, 2021 for U.S. Appl. No. 17/124,551.

International Search Report and Written Opinion dated Mar. 19, 2021 for PCT/US20/67289-WO/2021/138307.

European Search Report dated Nov. 25, 2021 for European Patent Application No. 20910078.3 (EP stage of PCT/US20/67289-WO/2021/138307).

European Search Report dated Nov. 19, 2021 for European Patent Application No. 21191780.2 (EP divisional of PCT/US20/67289-WO/2021/138307).

Extended European Search Report dated Mar. 31, 2022 for European Patent Application No. 20910078.3 (EP stage of PCT/US20/67289-WO/2021/138307).

Extended European Search Report dated Mar. 31, 2022 for European Patent Application No. 21191780.2 (EP divisional of PCT/US20/67289-WO/2021/138307).

European Office Action dated Sep. 27, 2023 for European Patent Application No. 21191780.2.

European Search Report dated Aug. 4, 2023 for European Patent Application No. 23184866.4.

* cited by examiner

AIRCRAFT HEAT EXCHANGER

CROSS-REFERENCE TO RELATED APPLICATION

Benefit is claimed of U.S. Patent Application No. 62/963,072, filed Jan. 19, 2020, and entitled "Aircraft Heat Exchanger", the disclosure of which is incorporated by reference herein in its entirety as if set forth at length.

BACKGROUND

The disclosure relates to gas turbine engine heat exchangers. More particularly, the disclosure relates to air-to-air heat exchangers.

Examples of gas turbine engine heat exchangers are found in: United States Patent Application Publication 20190170445A1 (the '445 publication), McCaffrey, Jun. 6, 2019, "HIGH TEMPERATURE PLATE FIN HEAT EXCHANGER"; United States Patent Application Publication 20190170455A1 (the '455 publication), McCaffrey, Jun. 6, 2019, "HEAT EXCHANGER BELL MOUTH INLET"; and United States Patent Application Publication 20190212074A1 (the '074 publication), Lockwood et al., Jul. 11, 2019, "METHOD FOR MANUFACTURING A CURVED HEAT EXCHANGER USING WEDGE SHAPED SEGMENTS", the disclosures of which three publications are incorporated by reference in their entireties herein as if set forth at length.

An exemplary positioning of such a heat exchanger provides for the transfer of thermal energy from a flow (heat donor flow) diverted from an engine core flow to a bypass flow (heat recipient flow). For example, air is often diverted from the compressor for purposes such as cooling. However, the act of compression heats the air and reduces its cooling effectiveness. Accordingly, the diverted air may be cooled in the heat exchanger to render it more suitable for cooling or other purposes. One particular example draws the heat donor airflow from a diffuser case downstream of the last compressor stage upstream of the combustor. This donor flow transfers heat to a recipient flow which is a portion of the bypass flow. To this end, the heat exchanger may be positioned within a fan duct or other bypass duct. The cooled donor flow is then returned to the engine core (e.g., radially inward through struts) to pass radially inward of the gas path and then be passed rearward for turbine section cooling including the cooling of turbine blades and vanes. The heat exchanger may conform to the bypass duct. The bypass duct is generally annular. Thus, the heat exchanger may occupy a sector of the annulus up to the full annulus.

Other heat exchangers may carry different fluids and be in different locations. For example, instead of rejecting heat to an air flow in a bypass duct, other heat exchangers may absorb heat from a core flow (e.g., as in recuperator use). Among further uses for heat exchangers in aircraft are power and thermal management systems (PTMS) also known as integrated power packages (IPP). One example is disclosed in United States Patent Application publication 20100170262A1, Kaslusky et al., Jul. 8, 2010, "AIRCRAFT POWER AND THERMAL MANAGEMENT SYSTEM WITH ELECTRIC CO-GENERATION". Another example is disclosed in United States Patent Application publication 20160362999A1, Ho, Dec. 15, 2016, "EFFICIENT POWER AND THERMAL MANAGEMENT SYSTEM FOR HIGH PERFORMANCE AIRCRAFT". Another example is disclosed in United States Patent Application publication 20160177828A1, Snyder et al., Jun. 23, 2016, "STAGED HEAT EXCHANGERS FOR MULTI-BYPASS STREAM GAS TURBINE ENGINES".

U.S. Pat. No. 10,100,740 (the '740 patent, the disclosure of which is incorporated by reference in its entirety herein as if set forth at length), to Thomas, Oct. 16, 2018, "Curved plate/fin heater exchanger", shows attachment of a square wave form fin array to the side of a heat exchanger plate body. For plates in a radial array, the wave amplitude progressively increases to accommodate a similar increase in inter-plate spacing.

SUMMARY

One aspect of the disclosure involves a heat exchanger plate for providing heat transfer between a first flow along a first flowpath and a second flow along a second flowpath. The heat exchanger plate comprises a substrate having: a first face and a second face opposite the first face; a leading edge along the second flowpath and a trailing edge along the second flowpath; a proximal portion (e.g., a proximal edge or bosses on a proximal edge) having a plurality of inlet ports along the first flowpath and a plurality of outlet ports along the first flowpath; and a plurality of passageways along the first flowpath. Each passageway extends between a respective associated said inlet port of the plate and a respective associated said outlet port of the plate.

A further embodiment of any of the foregoing embodiments may additionally and/or alternatively include: the inlet ports being closer to the first face than are the outlet ports; and the outlet ports being closer to the second face than are the inlet ports.

A further embodiment of any of the foregoing embodiments may additionally and/or alternatively include: each plate having a distal edge and a proximal edge; and each passageway having at least one turn adjacent the distal edge A further embodiment of any of the foregoing embodiments may additionally and/or alternatively include: each passageway having a plurality of turns adjacent the distal edge; and each passageway having at least one turn adjacent the proximal edge.

A further embodiment of any of the foregoing embodiments may additionally and/or alternatively include: the passageways being arrayed between the leading edge and the trailing edge.

A further embodiment of any of the foregoing embodiments may additionally and/or alternatively include: each inlet port being closer to the trailing edge than is the associated outlet port.

A further embodiment of any of the foregoing embodiments may additionally and/or alternatively include the plate having two to fifty of said passageways.

A further embodiment of any of the foregoing embodiments may additionally and/or alternatively include said passageways being in a casting.

A further embodiment of any of the foregoing embodiments may additionally and/or alternatively include a plurality of fin structures along the first face, each fin structure comprising: a base secured to the first face; and a first fin and a second fin extending from respective first and second edges of the base.

Another aspect of the disclosure involves a heat exchanger for providing heat transfer between a first flow along a first flowpath and a second flow along a second flowpath. The heat exchanger comprises at least one plate bank comprising a plurality of plates of any of the foregoing embodiments.

A further embodiment of any of the foregoing embodiments may additionally and/or alternatively include the plurality of plates being a first group of plates and a second group of plates, the second group of plates alternating with the first group of plates.

A further embodiment of any of the foregoing embodiments may additionally and/or alternatively include the plates of the second group of plates being mirror images of the plates of the first group of plates.

A further embodiment of any of the foregoing embodiments may additionally and/or alternatively include a manifold structure having: an inlet manifold having at least one inlet port and at least one outlet port; and an outlet manifold having at least one outlet port and at least one inlet port. The first flowpath passes from the at least one inlet port of the inlet manifold, through the at least one passageway of each of the plurality of plates, and through the at least one outlet port of the outlet manifold.

A further embodiment of any of the foregoing embodiments may additionally and/or alternatively include the manifold structure being arcuate having a convex first face and a concave second face; and the at least one plate bank being mounted along the concave second face.

A further embodiment of any of the foregoing embodiments may additionally and/or alternatively include: the inlet manifold enclosing an inlet plenum having a plurality of legs; and the outlet manifold enclosing an outlet plenum having a plurality of legs interdigitated with the legs of the inlet plenum.

A further embodiment of any of the foregoing embodiments may additionally and/or alternatively include: all but one of the legs of the inlet plenum feeding inlet ports of exactly two said plates; and all but one of the legs of the outlet plenum receiving flow from exactly two of the plates.

A further embodiment of any of the foregoing embodiments may additionally and/or alternatively include each heat exchanger plate inlet port being closer to the trailing edge than is the associated heat exchanger plate outlet port.

A further embodiment of any of the foregoing embodiments may additionally and/or alternatively include each heat exchanger plate inlet port being closer to the trailing edge than is the associated heat exchanger plate outlet port.

A further embodiment of any of the foregoing embodiments may additionally and/or alternatively include: each plate having a distal edge and a proximal edge; for each plate, each passageway having at least one turn adjacent the distal edge; and for each plate, the passageways being arrayed between the leading edge and the trailing edge.

Another aspect of the disclosure involves a gas turbine engine including the heat exchanger any of the foregoing embodiments wherein the first flow is a bleed flow and the second flow is a bypass flow.

Another aspect of the disclosure involves a method for manufacturing the heat exchanger plate of any of the foregoing embodiments, the method comprising: casting an alloy over a plurality of identical casting cores; and removing the cores to leave respective said passageways.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
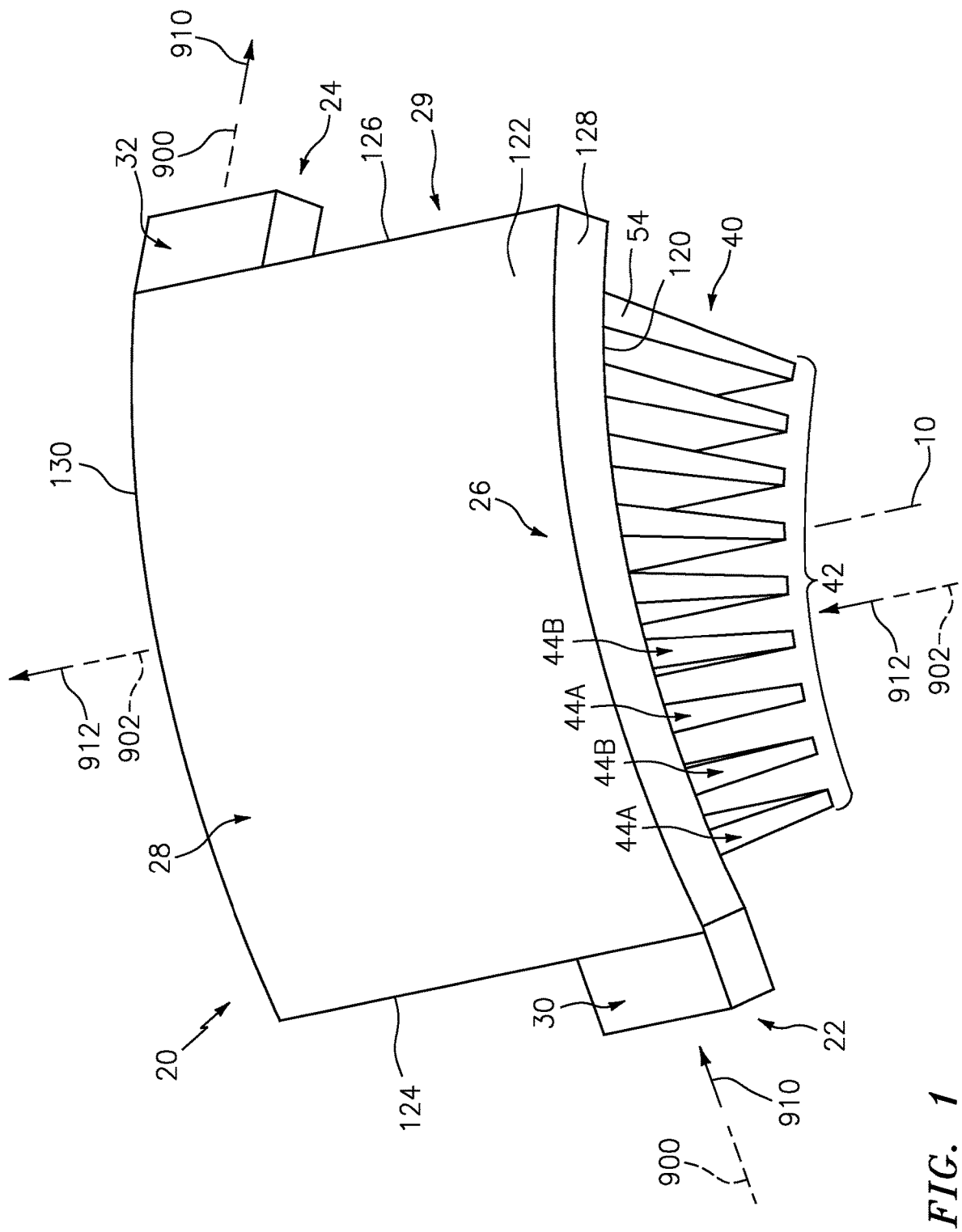
FIG. 1 is a partially schematic view of a heat exchanger.

FIG. 1 shows a gas turbine engine heat exchanger 20 providing heat exchange between a first flowpath 900 and a second flowpath 902 and thus between their respective first and second fluid flows 910 and 912. In the exemplary embodiment, the flowpaths 900, 902 are gas flowpaths passing respective gas flows 910, 912. In the illustrated example, the first flow 910 enters the heat exchanger 20 as a single piped flow and exits as a single piped flow 910; whereas the flow 912 is sector portion of an axial annular flow surrounding a central longitudinal axis (centerline) 10 of the heat exchanger and associated engine. For purposes of schematic illustration, the exemplary heat exchanger 20 is shown shaped in an arcuate form to occupy about 40° of a 360° annulus. There may be multiple such heat exchangers occupying the full annulus or one or more such heat exchangers occupying only a portion of the annulus.

Other connections are also possible. For example, a configuration with a single first flow inlet and branched first flow outlets is shown in copending International Patent Application No. PCT/US2020/067289 (the '289 application), filed Dec. 29, 2020 and entitled "Aircraft Heat Exchanger Assembly", the disclosure of which is incorporated by reference herein in its entirety as if set forth at length.

Figure 2:
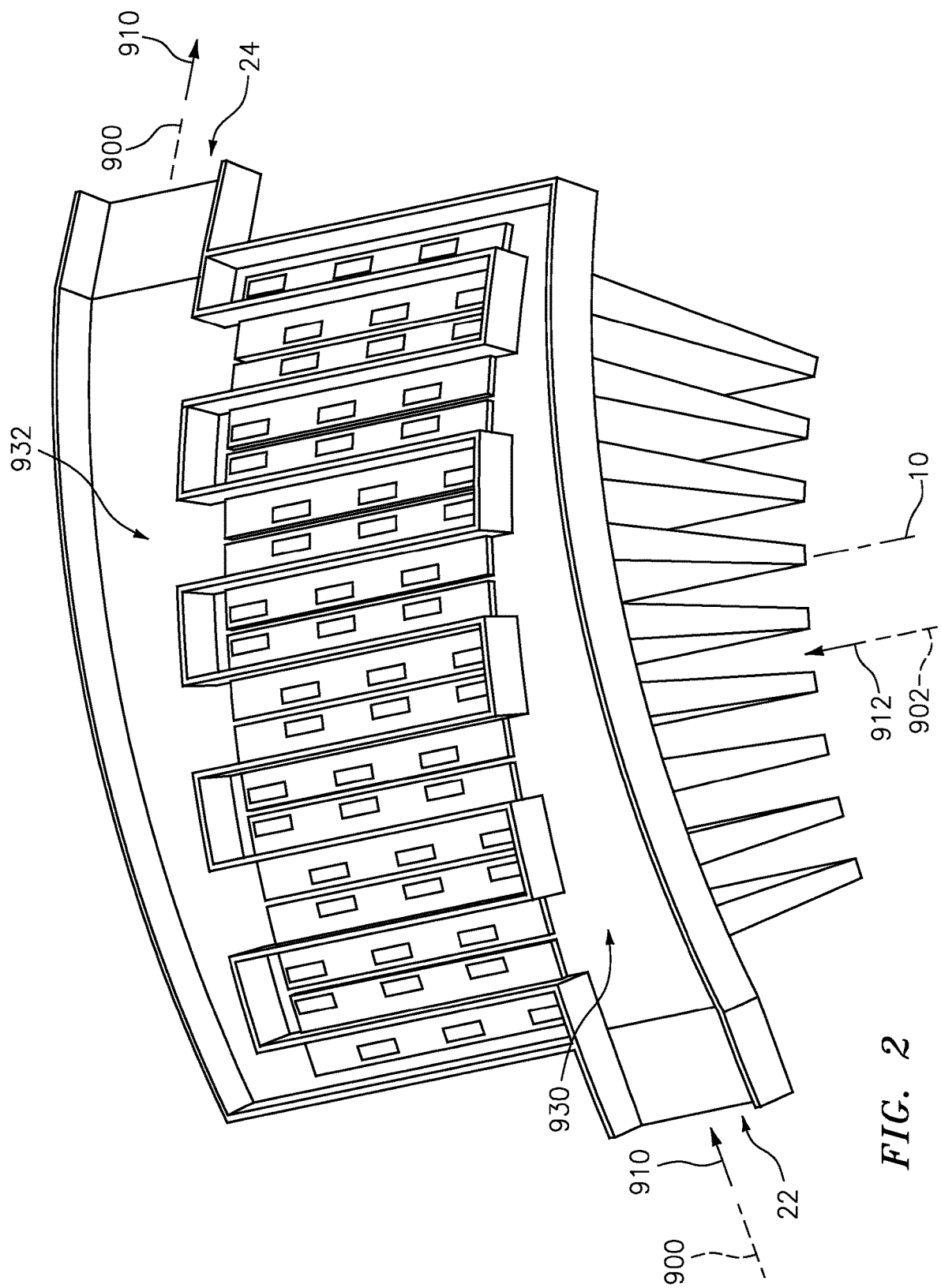
FIG. 2 is a view of the heat exchanger with outer diameter (OD) wall/panel/cover removed.
Figure 3:
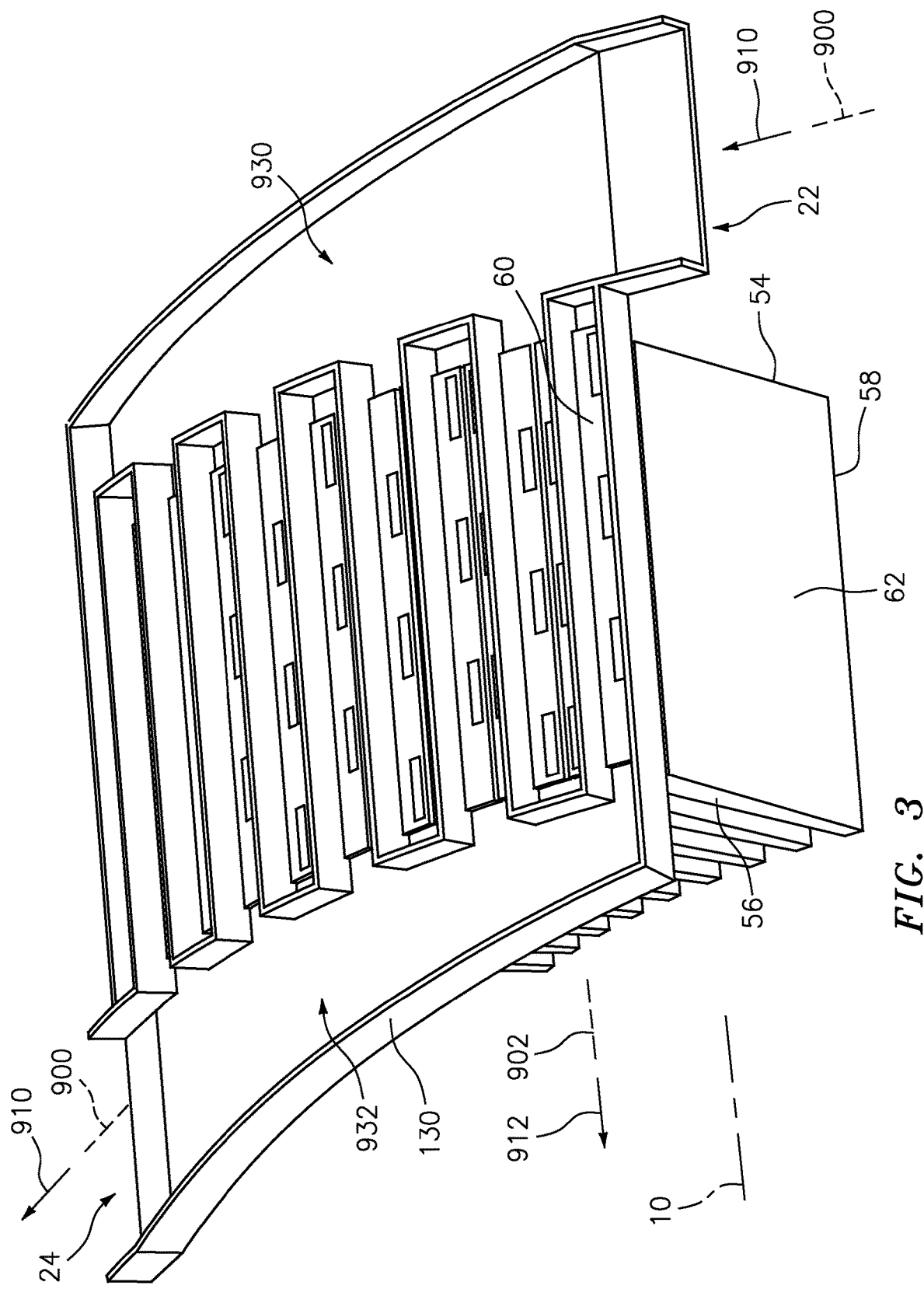
FIG. 3 is a second view of the heat exchanger with outer diameter (OD) wall/panel/cover removed.

The heat exchanger 20 has an inlet 22 and outlet 24 for the first flow 910. The exemplary inlet and outlet are, respectively, ports of an inlet manifold 26 and an outlet manifold 28 (discussed below). The exemplary inlet manifold and outlet manifold are portions of a single manifold unit 29 enclosing a respective inlet plenum 930 and outlet plenum 932 (FIGS. 2 and 3). Exemplary manifolds are metallic (e.g., nickel-based superalloy, e.g., cast or formed from pieces of cut and bent/formed sheet/plate stock joined via brazing, diffusion bonding, and the like). The inlet manifold and outlet manifold may each have a respective fitting 30, 32 (FIG. 1) providing the associated port 22, 24. As is discussed further below, the inlet manifold and outlet manifold are coupled to heat exchanger plates of one or more exemplary plate banks 40.

Each plate bank 40 comprises an array 42 of plates 44A, 44B (discussed further below). The exemplary manifold unit 29 is arcuate to conform to a sector of an annular duct. Thus, the array is a circumferential array. As is discussed further below, the plates 44A are of opposite sense to the plates 44B (e.g., mirror images) and alternate therewith in the array 42. In the exemplary bank 40, the plates extend axially and radially relative to the axis 10. With the exemplary manifold 29 radially outboard of the plates, the plates converge toward each other in the inward radial direction. Each plate 44A, 44B (FIG. 7) has a plurality of inlet ports 46A, 46B, 46C and a respective plurality of outlet ports 48A, 48B, 48C. Between each inlet port and its respective associated outlet port, a respective passageway 960A, 960B, 960C extends.

Each plate 44A, 44B comprises a body or substrate 52 (FIG. 7) (e.g., cast or additively manufactured alloy such as nickel-based superalloy) having a leading edge 54, a trailing edge 56, a distal edge 58 (an inboard or inner diameter (ID) edge in the illustrated example), a proximal edge 60 (an outboard or outer diameter (OD) edge in the example), a first lateral face 62 (circumferential (generally circumferentially facing) face), and a second lateral face 64 (circumferential face in the example). In general, the term "plate" or "panel" may be applied at any of several levels of detail. It may identify a body or substrate of an assembly or the greater assembly or subassembly (e.g., a cast substrate plus one or more separately-attached fin arrays).

Figure 5:
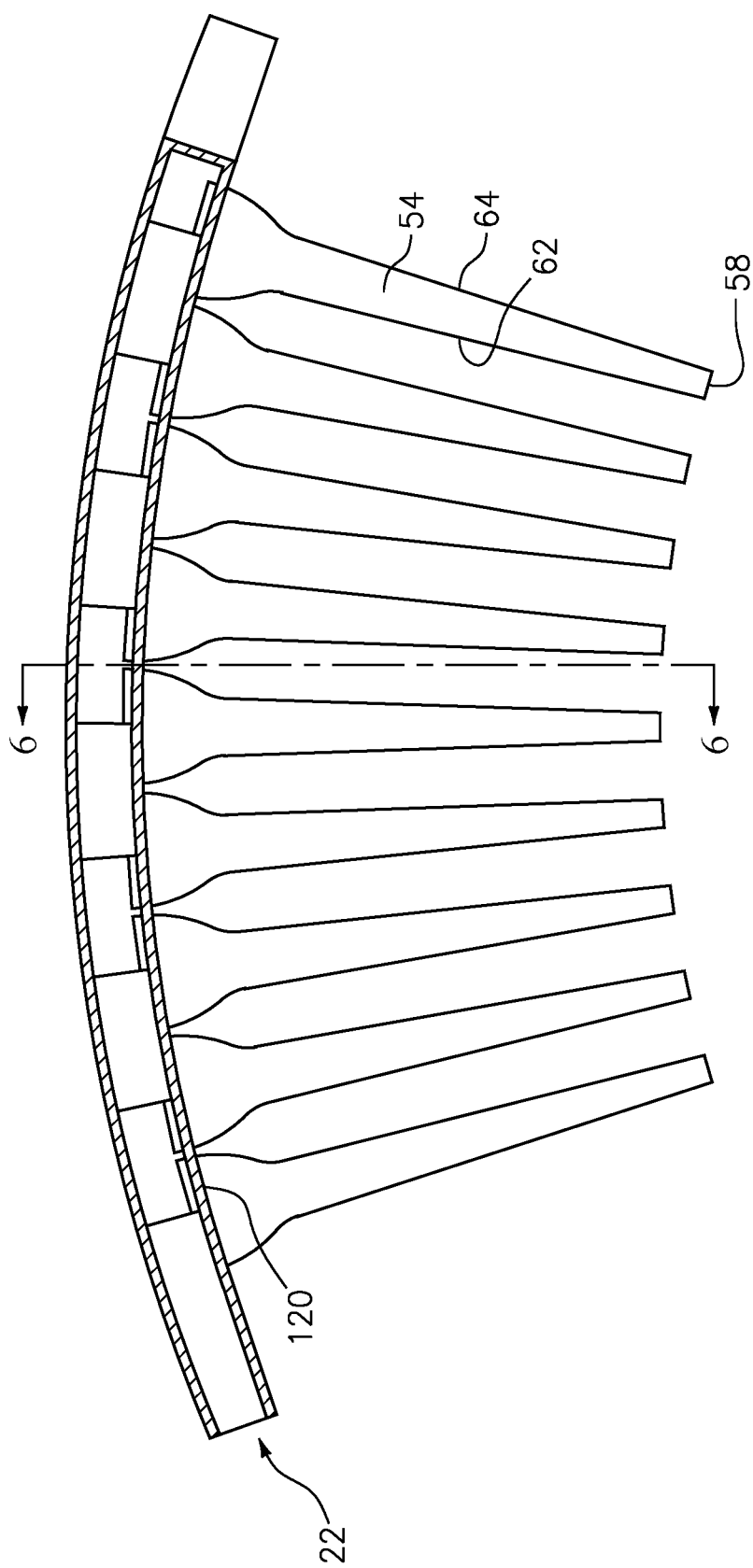
FIG. 5 is a transverse sectional view of the heat exchanger taken along line 5-5 of FIG. 4.
Figures 8, 8A:
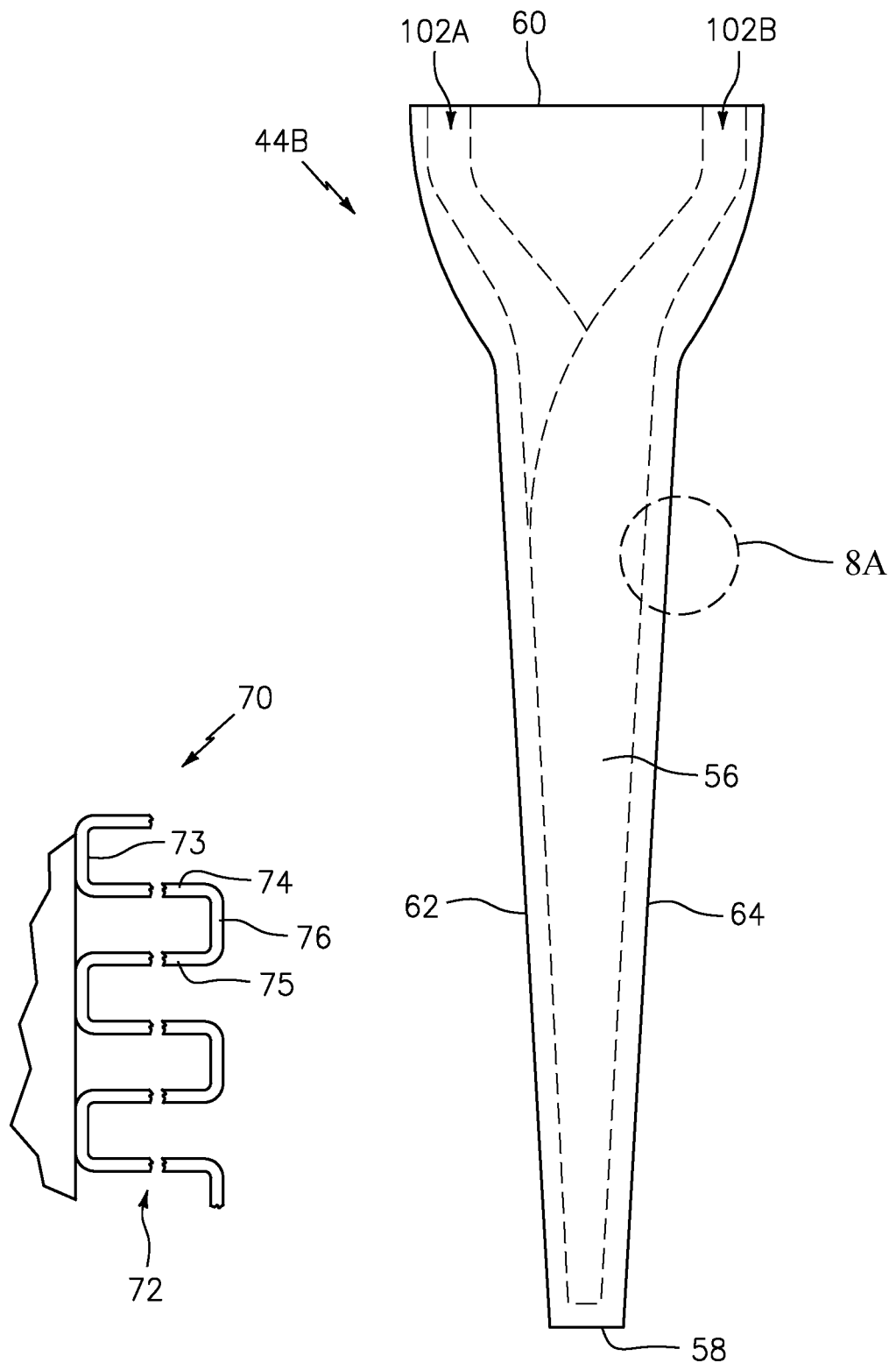
FIG. 8 is an end view of a second panel/plate body as a mirror image of the first panel/plate body.
FIG. 8A is an enlarged view of the second panel/plate body further showing fins attached to the panel/plate body.

As is discussed below, one or both faces 62, 64 may bear fin arrays 70 (FIG. 8A). The exemplary fins are separately formed (e.g., of folded sheetmetal—e.g., nickel-based superalloy) and secured (e.g., brazing, welding, diffusion bonding, and the like) to adjacent substrate(s) (generally see the '740 patent). The exemplary fins are shared by adjacent plates. As is discussed further below, exemplary fins are initially formed as square wave corrugations 72 (FIG. 5) of even height/amplitude whose troughs 73 are secured to the associated face 62, 64. The corrugation has legs 74, 75 and peaks 76 and extends from a first sectional end (an inner diameter (ID) end in the example) to a second section end (an outer diameter (OD) end in the example). Along the direction of the individual corrugations (streamwise of the ultimate second flow 912) the corrugation has a first end near the plate substrate upstream edge and a second end near the plate substrate downstream edge. The peaks 76 may be similarly secured to the adjacent face of the next plate in the array. In the ends of the array, there are numerous possibilities including adding one wave at the otherwise unfinned side of the terminal plate.

In alternative embodiments, corrugations may be secured to both faces and, after the wave corrugation(s) are secured, the peaks 76 and portions of the legs 74, 75 are cut off to create discrete pairs of fins. Each such fin extends to a free distal end/edge and each pair are joined by the intact trough 73. At the ends (ID and OD in the example) of the fin arrays, there may be boundary conditions whereby a single isolated fin exists secured by an isolated trough remnant. Exemplary cutting is via electrodischarge machining (EDM). For example, wire EDM fins are shown in copending U.S. patent application Ser. No. 17/137,946 (the '946 application), filed Dec. 30, 2020, and entitled "Aircraft Heat Exchanger Finned Plate Manufacture", the disclosure of which is incorporated by reference herein in its entirety as if set forth at length.

Returning to FIG. 7, in the exemplary mating configuration between manifold 29 and plate, the outer diameter edge 60 is flat and the ports 46A-46C are in one port bank 102A at one side of the flat edge surface 60 and the ports 48A-48C are in a second port bank 102B at the other. An alternative implementation (not shown) has a central recess dividing the proximal edge 60 of the plate into a respective first boss bearing the ports 46A-46C and a respective second boss bearing the ports 48A-48C. Both such bosses would protrude radially outward from a central base portion of the OD edge 60.

The exemplary manifold unit 29 (FIG. 1) has a main body portion having an inner diameter surface 120, an outer diameter surface 122, a first circumferential end 124, a second circumferential end 126, a leading end 128, and a trailing end 130. In the exemplary embodiment, the inlet 22 is formed on a conduit extending from a junction of the leading end 128 and first circumferential end 124 and the outlet 24 is formed on a conduit extending from a junction of the trailing end 130 and second circumferential end 126. In other embodiments, the inlet and outlet 22 and 24 may be otherwise positioned.

Figure 4:
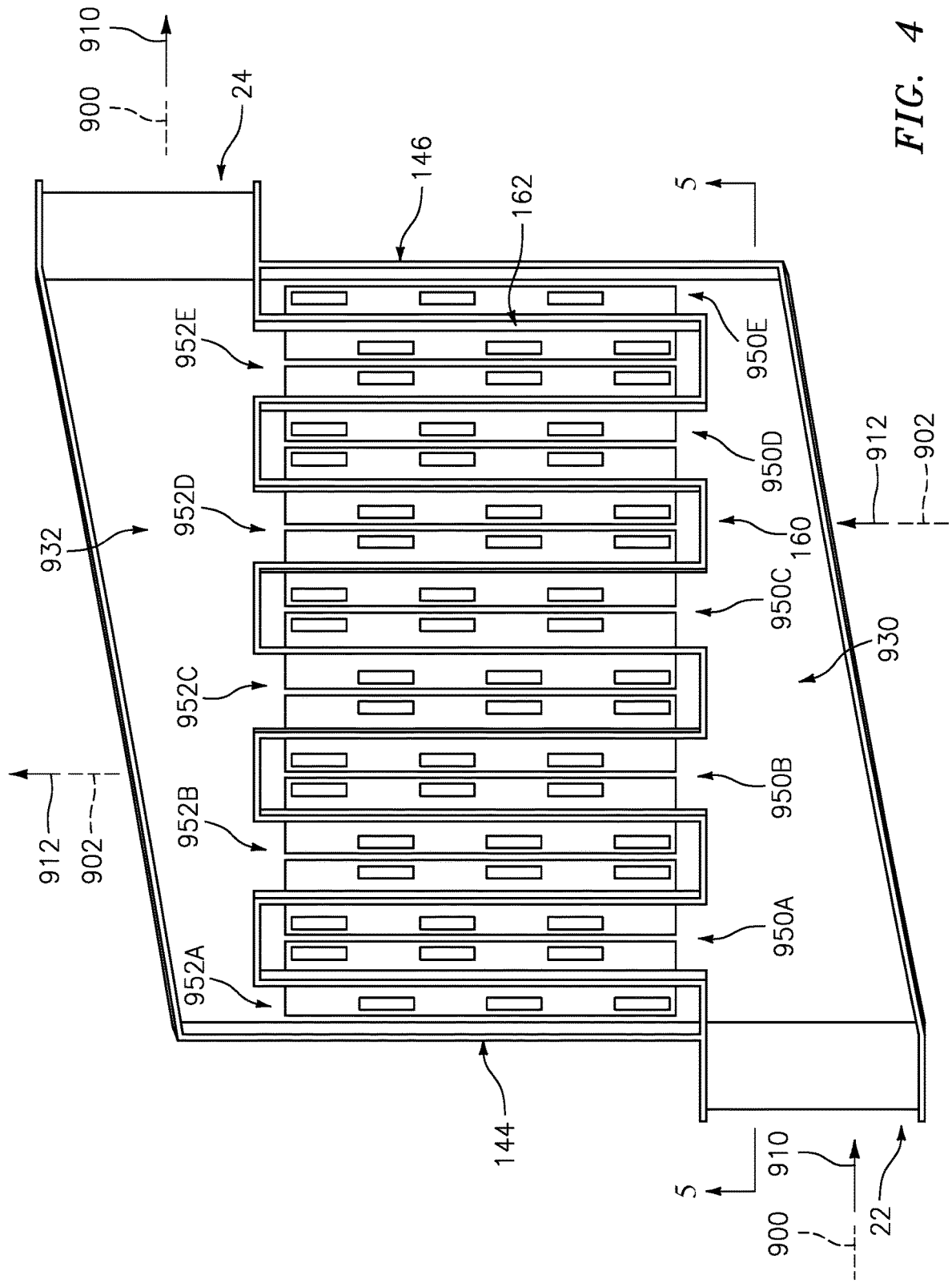
FIG. 4 is a radially inward view of the heat exchanger with outer diameter (OD) wall/panel/cover removed.
Figure 6:
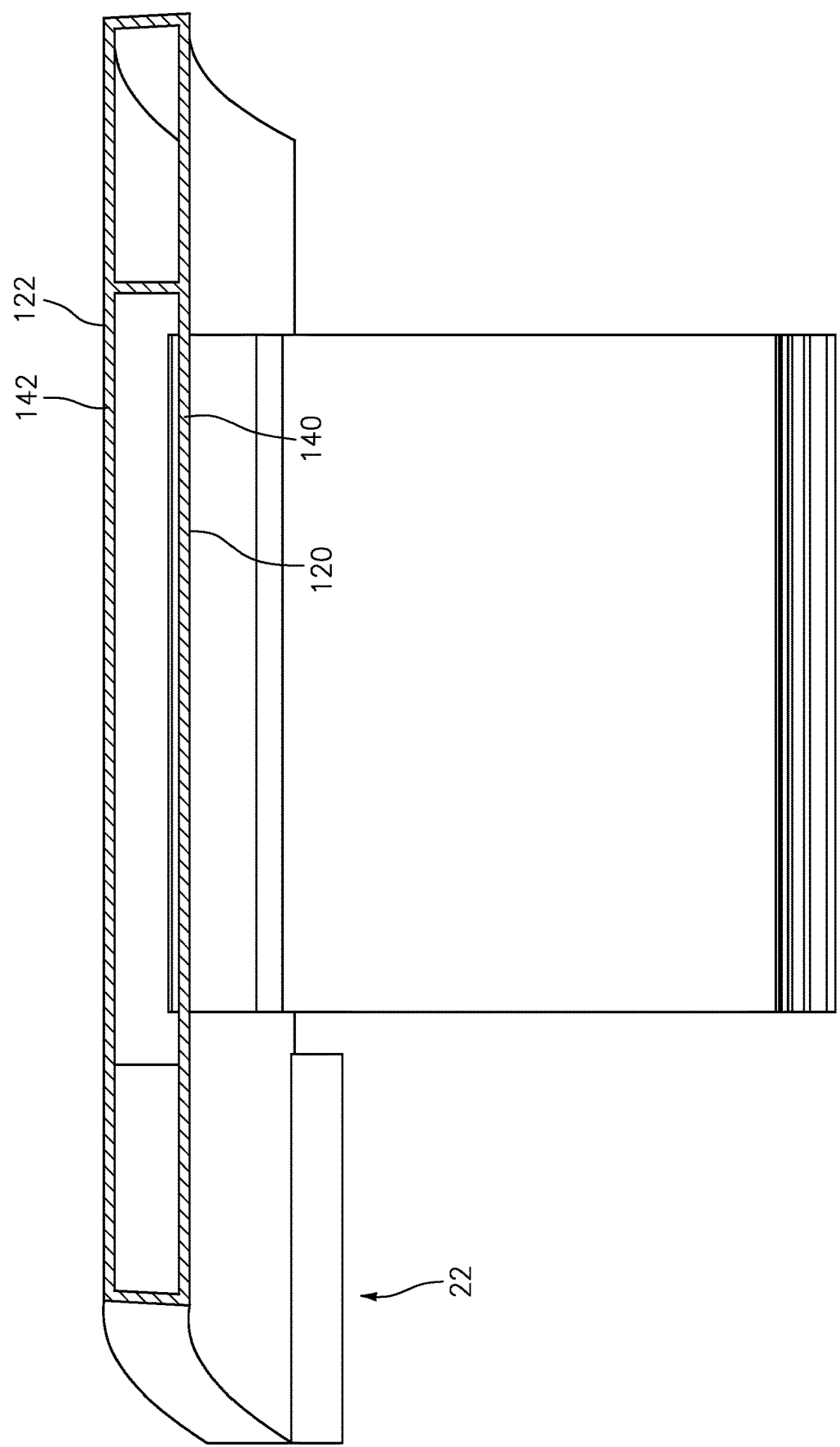
FIG. 6 is an axial sectional view of the heat exchanger taken along line 6-6 of FIG. 5.

The exemplary ID surface 120 (FIG. 6) is a portion of an ID wall 140, the exemplary OD surface 122 is along an OD wall 142, and the exemplary first and second circumferential end surfaces are along respective first and second circumferential end walls 144 and 146 (FIG. 4). With the concave manifold ID surface 120 and plate substrate later al faces 62, 64 converging at a corresponding angle, portions of adjacent faces 62, 64 of adjacent plates may be parallel and thus facilitate use of a uniform amplitude fin wave/corrugation to span between adjacent plates. Such fins are disclosed in copending U.S. patent application Ser. No. 17/124,790 (the '790 application), filed Dec. 17, 2020, and entitled "Aircraft Heat Exchangers and Plates", the disclosure of which is incorporated by reference herein in its entirety as if set forth at length. The '790 application also discussed resonance behavior benefits of the face convergance.

The exemplary inlet plenum and exemplary outlet plenum have interdigitated terminal legs 950A-950E for the inlet plenum 930 and 952A-952E for the outlet plenum 932 extending axially within the manifold main unit. In the illustrated embodiment, except at terminal port banks (102A, 102B at the two ends of the plate array), each plenum leg 950A-950D and 952B-952E communicates with the ports of two adjacent port banks of two adjacent plates. Thus, in this example with mirror image plates, the flow within each plate is parallel the flow in the adjacent plate. To divide the two plenums 930, 932 from each other, the manifold unit 29 includes a wave-like wall structure 160 (FIG. 4) shared by and separating the inlet and outlet manifold and dividing their plenums' respective fingers/legs 950A-950E and 952A-952E from each other.

Figure 9:
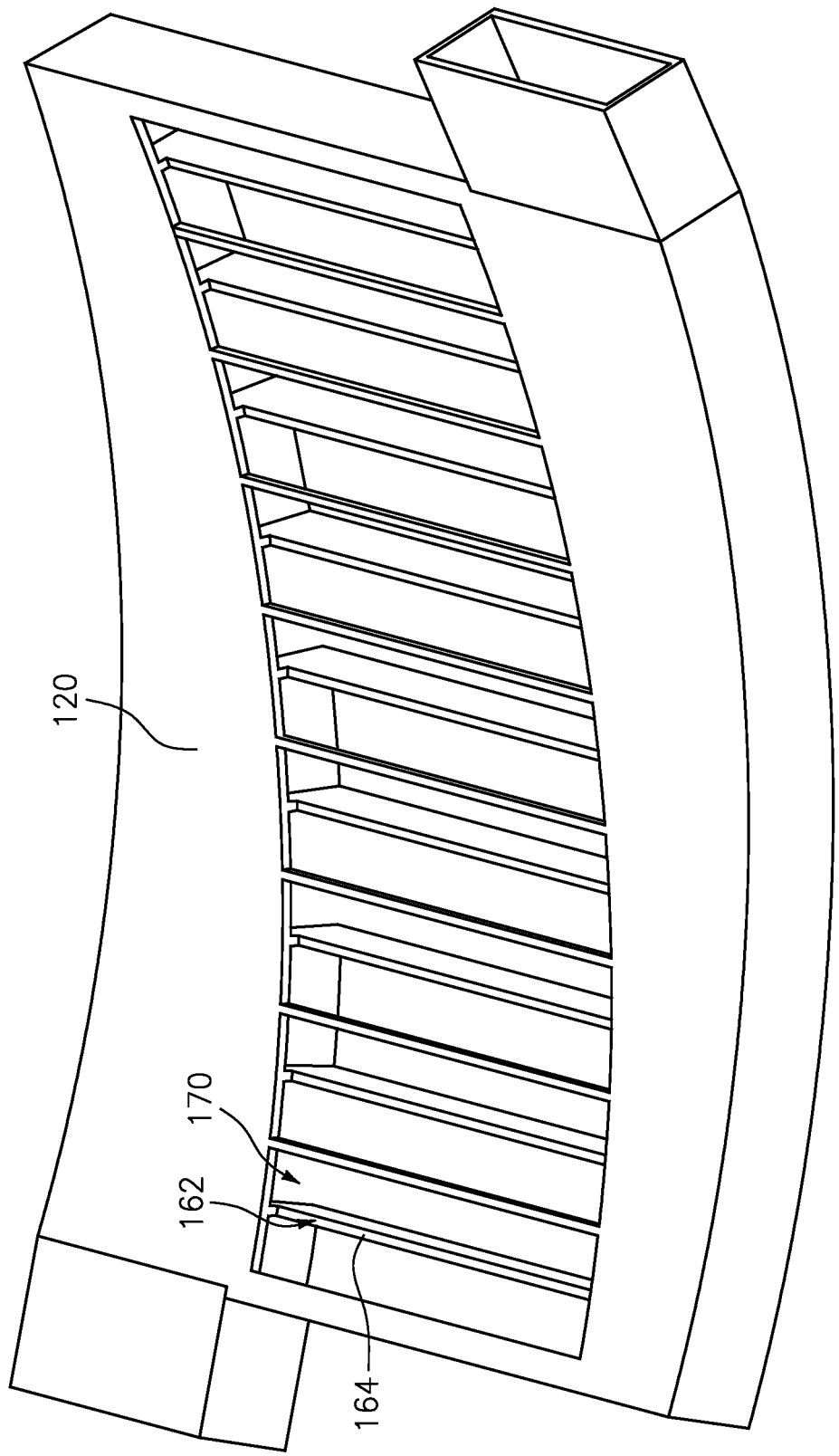
FIG. 9 is a view of a manifold structure of the heat exchanger.

FIG. 9 shows the wall structure 160 as including a plurality of axially-extending walls 162 separating adjacent plenum fingers/legs 950A-950E and 952A-952E from each other. With the exemplary flat plate proximal edge 60, the walls span an aperture 170 in the ID wall 140 that receives the proximal edge 60 of the associated plate, with an inner diameter (ID) edge 164 of the wall 160 sealed to the proximal edge (e.g., via welding, brazing, diffusion bonding, or the like). The exemplary ID edge 164 is recessed relative to the surface 120 to create a socket for receiving the proximal edge 60. In the unillustrated alternate embodiment of two distinct proximal bosses at the proximal edge, the wall 160 may be flush with the surface 120 and the two bosses may be received in or otherwise mate with two distinct apertures in the ID wall 140 on the respective sides of the wall 160.

Figure 7:
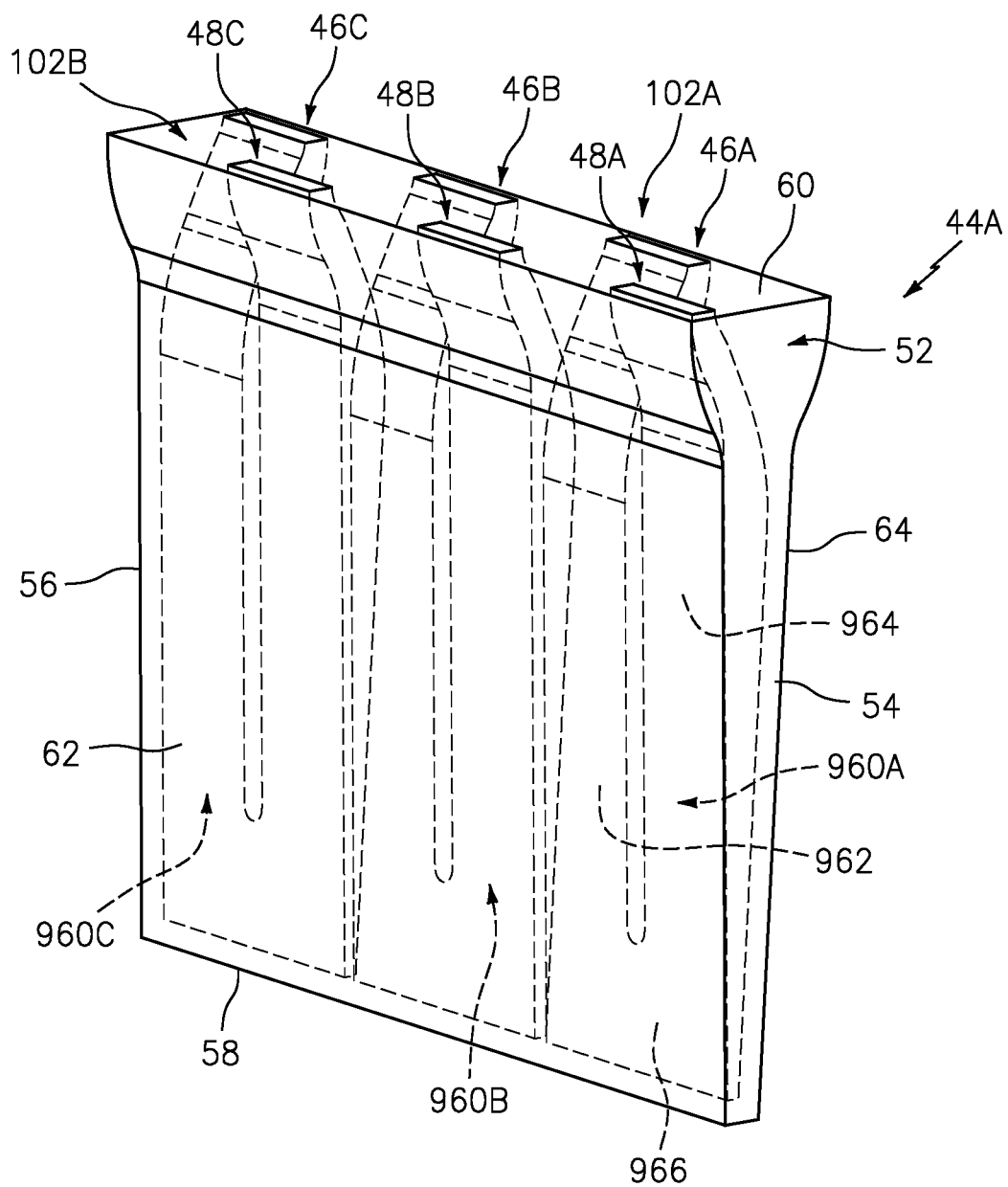
FIG. 7 is a view of a first panel/plate body of the heat exchanger.
Figure 10:
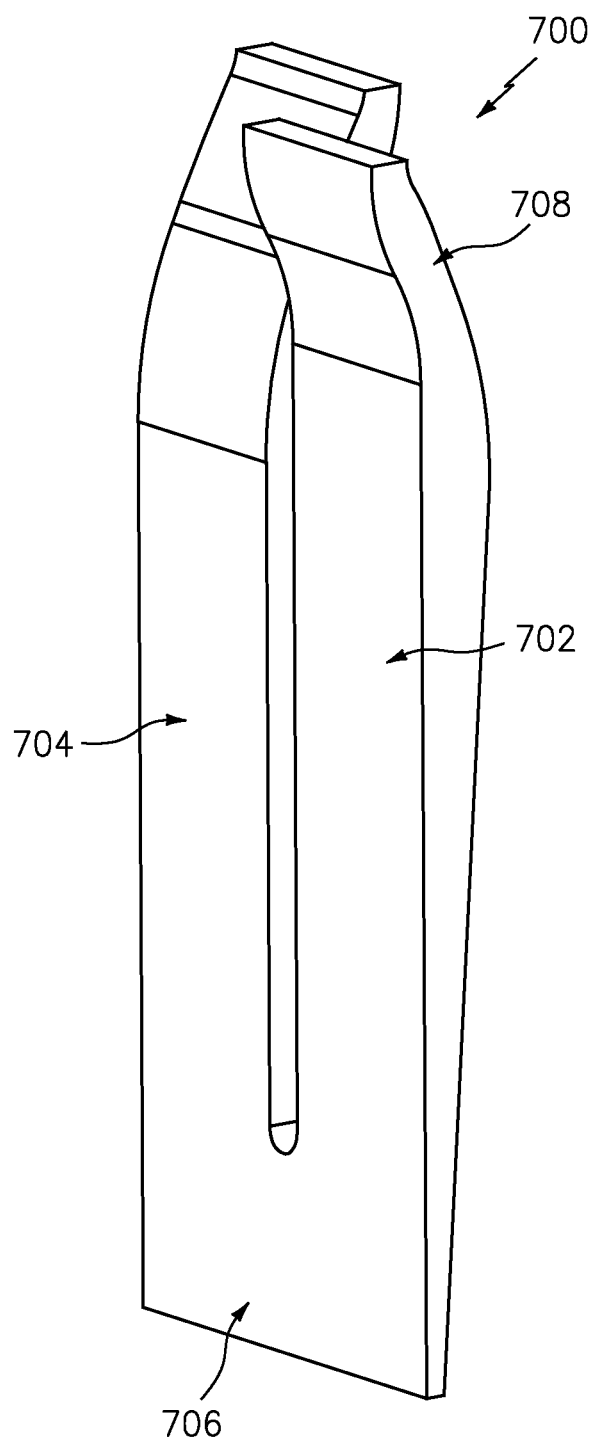
FIG. 10 is a view of a casting core for casting a passageway in the first panel/plate body of the heat exchanger.

FIG. 7 shows plate passageways 960A, 960B, 960C between each plate inlet 46A-46C and its associated outlet 48A-48C. Each passageway has an upstream leg 962, a downstream leg 964, and a turn 966 near the distal edge 58. Thus, in each plate passageway 960, an associated portion of the first flow 910 passes generally from downstream along the second flowpath (near the trailing edge 56) to upstream (nearer the leading edge 54). Thus, there is a bit of a counter-flow heat exchange effect. In the exemplary embodiment, each of the passageways 960A-960C of a given first plate 44A is identical to each other. Similarly, each passageway 960A-960C of a given second plate 44B is identical to each other and a mirror to those of the first plate. FIG. 10 shows a casting core 700 (e.g., molded ceramic such as alumina) used to cast the passageways of the first plates 44A (a core for casting the passageways of the second plates 44B being a mirror image). As does the passageway 960A-960C, the core 700 has legs 702 and 704 and a turn 706. Laterally offsetting the plate inlets 46A-46C from the associated plate outlets 48A-48C, end portions of the legs 702, 704 opposite the turn 706 are laterally offset from each other (e.g., via dog leg-like turns 708 when viewed parallel to the ultimate engine axis 10). The cores may be pre-molded with features for forming enhancements on the passageways. For example, chevron or other recesses in the cores may cast chevron or other trip strip protrusions along the passageways.

The use of identical cores 700 for casting identical passageways in each given one of the two plate senses 44A, 44B allows for a degree of expandability/modularity. For example, if longer plates are desired (longer along the second flowpath 902) more cores 700 may be used to cast more associated passageways. If only a single sense of plates is used, either the counter-flow effect may be surrendered or a more complex plenum structure (plenum legs only serving a single plate) may be used. In one modularity example, for each of the two senses of plate, one basic core may have three sets of legs and turns for casting three passageways, while another has two. Various combinations of these may be used to cast plates with any number of passageways of at least two. An additional, larger core (e.g., five or ten passageways) may be useful when seeking to produce plates with large numbers of passageways. Thus, exemplary passageway count is two to fifty, more particularly three to fifty.

Figure 11:
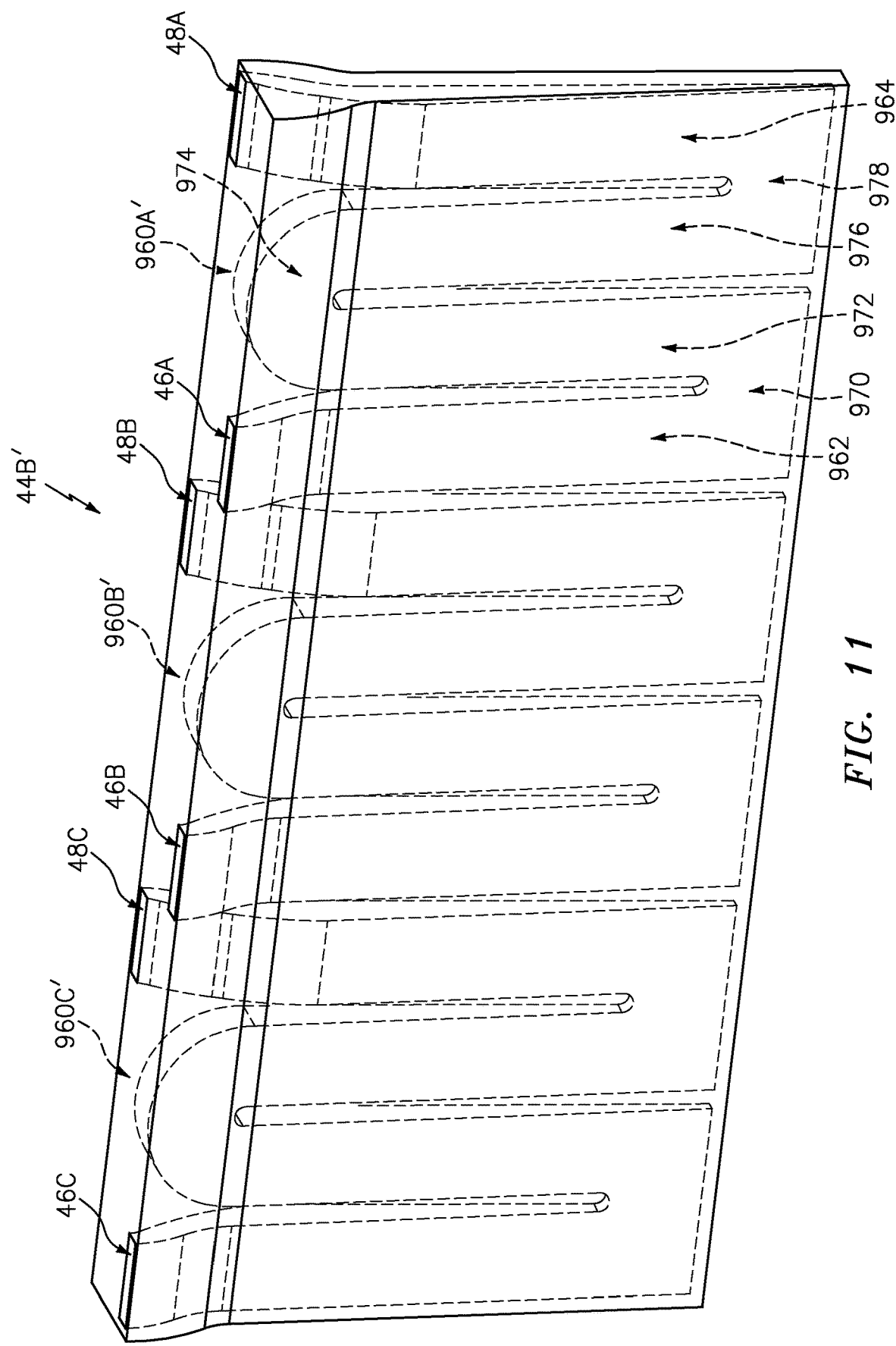
FIG. 11 is a view of a third panel/plate/body similar to the second panel/plate body but having passageways with additional turns and legs.

In a further variation, in the FIG. 11 plate 44B' otherwise similar to 44B, each passageway 960A', 960B', 960C' has four legs creating an up-pass (away from the inlet)/down-pass/up-pass/down-pass configuration. The first leg (inlet leg) 962 feeds a first turn 970 at the distal edge which feeds a first intermediate leg 972. The first intermediate leg feeds an intermediate turn 974 near the proximal edge. The intermediate turn 974 feeds a second intermediate leg 976 which feeds a final turn 978 to the final leg (outlet leg) 964. Such plate and a mirror image plate (not shown) may be used in place of 44B and 44A, respectively. Yet other embodiments may include more turns and legs.

Figure 12:
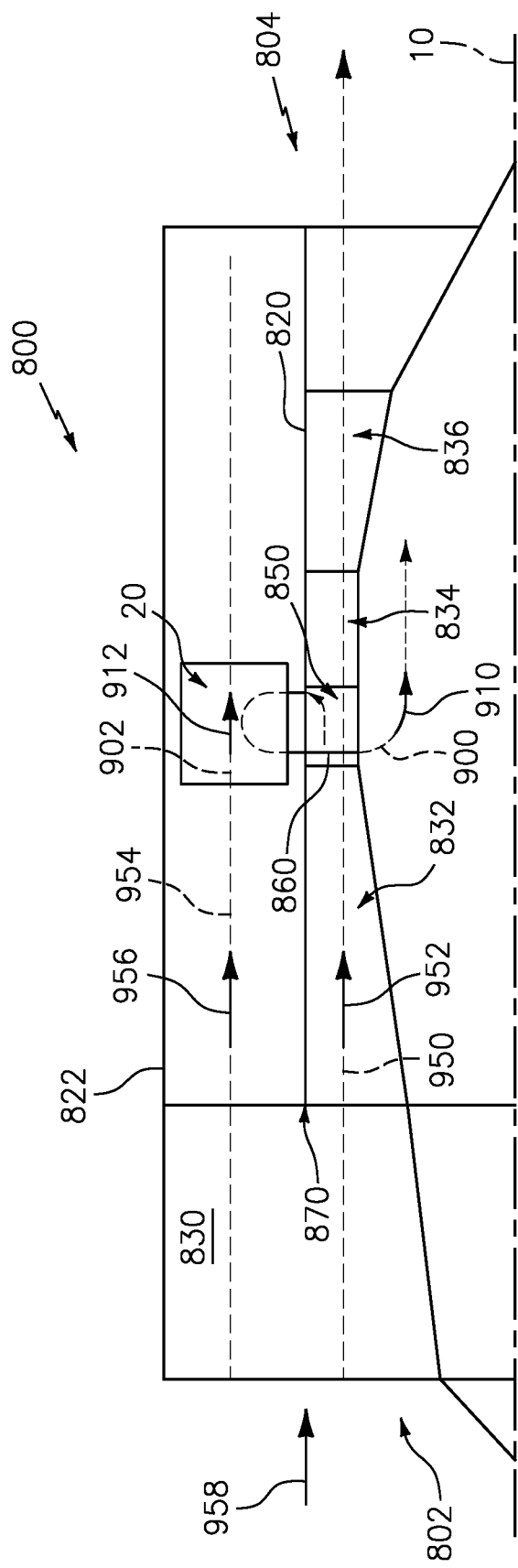
FIG. 12 is a schematic axial half section view of a gas turbine engine including the heat exchanger.

FIG. 12 schematically shows a gas turbine engine 800 as a turbofan engine having a centerline or central longitudinal axis 10 and extending from an upstream end at an inlet 802 to a downstream end at an outlet 804. The exemplary engine schematically includes a core flowpath 950 passing a core flow 952 and a bypass flowpath 954 passing a bypass flow 956. The core flow and bypass flow are initially formed by respective portions of a combined inlet airflow 958 divided at a splitter 870.

A core case or other structure 820 divides the core flowpath from the bypass flowpath. The bypass flowpath is, in turn, surrounded by an outer case 822 which, depending upon implementation, may be a fan case. From upstream to downstream, the engine includes a fan section 830 having one or more fan blade stages, a compressor 832 having one or more sections each having one or more blade stages, a combustor 834 (e.g., annular, can-type, or reverse flow), and a turbine 836 again having one or more sections each having one or more blade stages. For example, many so-called two-spool engines have two compressor sections and two turbine sections with each turbine section driving a respective associated compressor section and the lower pressure downstream turbine section also driving the fan (optionally via a gear reduction). Yet other arrangements are possible.

FIG. 12 shows the heat exchanger 20 positioned in the bypass flowpath so that a portion of the bypass flowpath 954 becomes the second flowpath 902 and a portion of the bypass flow 956 becomes the second airflow 912.

The exemplary first airflow 910 is drawn as a compressed bleed flow from a diffuser case 850 between the compressor 832 and combustor 834 and returned radially inwardly back through the core flowpath 950 via struts 860. Thus, the flowpath 900 is a bleed flowpath branching from the core flowpath.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A heat exchanger for providing heat transfer between a first flow along a first flowpath and a second flow along a second flowpath, the heat exchanger comprising
    at least one plate bank comprising a plurality of heat exchanger plates for providing heat transfer between the first flow along the first flowpath and the second flow along the second flowpath, each of the plurality of heat exchanger plates comprising a substrate having:
        a first face and a second face opposite the first face;
        a leading edge along the second flowpath and a trailing edge along the second flowpath;
        a proximal portion having a plurality of inlet ports along the first flowpath and a plurality of outlet ports along the first flowpath, wherein:
            the inlet ports are closer to the first face than are the outlet ports; and
            the outlet ports are closer to the second face than are the inlet ports; and
        a plurality of passageways along the first flowpath, each passageway extending between a respective associated said inlet port of the plate and a respective associated said outlet port of the plate; and
    a manifold structure comprising:
        an inlet manifold having at least one inlet port and at least one outlet port; and
        an outlet manifold having at least one outlet port and at least one inlet port, the first flowpath passing from the at least one inlet port of the inlet manifold, through the at least one passageway of each of the plurality of heat exchanger plates, and through the at least one outlet port of the outlet manifold, wherein:
    the inlet manifold encloses an inlet plenum having a plurality of legs;
    the outlet manifold encloses an outlet plenum having a plurality of legs interdigitated with the legs of the inlet plenum;
    one of the legs of the inlet plenum feeds inlet ports of exactly one of the plates;
    a remainder of the legs of the inlet plenum feed inlet ports of exactly two of the plates;
    one of the legs of the outlet plenum receives flow from exactly one of the plates; and
    a remainder of the legs of the outlet plenum receive flow from exactly two of the plates.

2. The heat exchanger of claim 1 wherein for each plate of the plurality of heat exchanger plates:
    the first face and the second face extend between the leading edge and the trailing edge.

3. The heat exchanger of claim 1 wherein for each plate of the plurality of heat exchanger plates:
    the plate has a distal edge; and
    each passageway has at least one turn adjacent the distal edge between an upstream leg and a downstream leg along the first flowpath, the upstream leg and downstream leg being spaced from each other between the leading edge and the trailing edge.

4. The heat exchanger of claim 3 wherein for each plate of the plurality of heat exchanger plates:
    each passageway has a plurality of turns adjacent the distal edge; and
    each passageway has at least one turn adjacent the proximal portion.

5. The heat exchanger of claim 3 wherein for each plate of the plurality of heat exchanger plates:
    the passageways are arrayed between the leading edge and the trailing edge.

6. The heat exchanger of claim 3 wherein for each plate of the plurality of heat exchanger plates:
    for each said passageway, the inlet port is closer to the trailing edge than is the associated outlet port.

7. The heat exchanger of claim 3 wherein for each plate of the plurality of heat exchanger plates:
    the proximal portion is a proximal edge.

8. The heat exchanger of claim 1 wherein for each plate of the plurality of heat exchanger plates:
    the plate has two to fifty of said passageways.

9. The heat exchanger of claim 1 wherein for each plate of the plurality of heat exchanger plates:
    said passageways are in a casting.

10. The heat exchanger of claim 1 wherein each plate of the plurality of heat exchanger plate further comprises a plurality of fin structures along the first face, each fin structure comprising:
    a base secured to the first face; and
    a first fin and a second fin extending from respective first and second edges of the base.

11. A gas turbine engine including the heat exchanger of claim 1 wherein:
    the first flow is a bleed flow and the second flow is a bypass flow.

12. A heat exchanger for providing heat transfer between a first flow along a first flowpath and a second flow along a second flowpath, the heat exchanger comprising:
    at least one plate bank comprising a plurality of heat exchanger plates for providing heat transfer between the first flow along the first flowpath and the second flow along the second flowpath, each of the plurality of heat exchanger plates comprising a substrate having:
        a first face and a second face opposite the first face;
        a leading edge along the second flowpath and a trailing edge along the second flowpath;
        a proximal portion having a plurality of inlet ports along the first flowpath and a plurality of outlet ports along the first flowpath, wherein:
            the inlet ports are closer to the first face than are the outlet ports; and
            the outlet ports are closer to the second face than are the inlet ports; and
        a plurality of passageways along the first flowpath, each passageway extending between a respective associated said inlet port of the plate and a respective associated said outlet port of the plate; and
    a manifold structure comprising:
        an inlet manifold having at least one inlet port and at least one outlet port; and
        an outlet manifold having at least one outlet port and at least one inlet port, the first flowpath passing from the at least one inlet port of the inlet manifold, through the at least one passageway of each of the plurality of heat exchanger plates, and through the at least one outlet port of the outlet manifold, wherein:
    the inlet manifold encloses an inlet plenum having a plurality of legs;
    the outlet manifold encloses an outlet plenum having a plurality of legs interdigitated with the legs of the inlet plenum; and
    for each said passageway, the heat exchanger plate inlet port is closer to the trailing edge than is the associated heat exchanger plate outlet port.

13. The heat exchanger of claim 12 wherein:
    the plurality of plates are a first group of plates and a second group of plates, the plates of the second group of plates alternating with the plates of the first group of plates.

14. The heat exchanger of claim 13 wherein:
    the plates of the second group of plates are mirror images of the plates of the first group of plates.

15. The heat exchanger of claim 12 wherein for each plate of the plurality of heat exchanger plates:
    each passageway has a plurality of turns adjacent the distal edge; and
    each passageway has at least one turn adjacent the proximal portion.

16. The heat exchanger of claim 12 wherein:
    the manifold structure is arcuate having a convex first face and a concave second face; and
    the at least one plate bank is mounted along the concave second face.

17. The heat exchanger of claim 12 wherein for each plate of the plurality of heat exchanger plates:
    the passageways are arrayed between the leading edge and the trailing edge.

18. The heat exchanger of claim 12 wherein for each plate of the plurality of heat exchanger plates:
    the plate has two to fifty of said passageways.

19. The heat exchanger of claim 12 wherein for each plate of the plurality of heat exchanger plates:
    said passageways are in a casting.

20. The heat exchanger of claim 12 wherein for each plate of the plurality of heat exchanger plates:
the plate has a distal edge;
each passageway has at least one turn adjacent the distal edge between an upstream leg and a downstream leg along the first flowpath, the upstream leg and downstream leg being spaced from each other between the leading edge and the trailing edge; and
the proximal portion is a proximal edge.

21. The heat exchanger of claim 12 wherein:
each plate has a distal edge;
for each plate, each passageway has at least one turn adjacent the distal edge; and
for each plate, the passageways are arrayed between the leading edge and the trailing edge.

22. A gas turbine engine including the heat exchanger of claim 12 wherein:
the first flow is a bleed flow and the second flow is a bypass flow.

* * * * *